(12) United States Patent
Mills

(10) Patent No.: US 8,940,212 B2
(45) Date of Patent: Jan. 27, 2015

(54) METHOD FOR PRODUCING A MOULDED PLASTIC PRODUCT

(75) Inventor: Gary Mills, Manchester (GB)

(73) Assignee: 100 Percent Recycled Panel Company Limited (GB)

( * ) Notice: Subject to any disclaimer, the term of this patent is extended or adjusted under 35 U.S.C. 154(b) by 29 days.

(21) Appl. No.: 13/979,347

(22) PCT Filed: Jan. 12, 2012

(86) PCT No.: PCT/GB2012/000029
§ 371 (c)(1),
(2), (4) Date: Jul. 11, 2013

(87) PCT Pub. No.: WO2012/095635
PCT Pub. Date: Jul. 19, 2012

(65) Prior Publication Data
US 2013/0285282 A1  Oct. 31, 2013

(30) Foreign Application Priority Data

Jan. 13, 2011 (EP) ..................................... 11150886
Jan. 18, 2011 (EP) ..................................... 11151312

(51) Int. Cl.
 *B29C 39/12* (2006.01)

(52) U.S. Cl.
USPC ........... 264/255; 264/267; 264/294; 264/325; 264/348

(58) Field of Classification Search
None
See application file for complete search history.

(56) References Cited

U.S. PATENT DOCUMENTS 2,802,766 A * 8/1957 Leverenz ...................... 264/46.6
3,286,004 A * 11/1966 Hill et al. ..................... 264/46.6
3,366,993 A * 2/1968 Lemelson ...................... 425/564
3,608,007 A * 9/1971 Henrikson .................... 264/45.5
3,949,125 A * 4/1976 Roberts ........................... 428/99
4,043,721 A * 8/1977 Lemelson ...................... 425/116
5,505,886 A 4/1996 Baugh et al.
5,972,259 A * 10/1999 Hettinga ...................... 264/45.5
6,146,562 A * 11/2000 Hettinga ...................... 264/45.5
6,599,452 B1 * 7/2003 Ferguson ..................... 264/46.4
6,899,835 B2 * 5/2005 Liittschwager et al. ..... 264/46.5

FOREIGN PATENT DOCUMENTS

| GB | 1082277 | 9/1967 |
| GB | 2466432 | 6/2010 |
| JP | 06238761 | 8/1994 |
| JP | 10128890 | * 5/1998 |
| JP | 11-188704 | * 7/1999 |
| WO | 2008/133535 | 11/2008 |

OTHER PUBLICATIONS

Database WPI Week; Thomson Scientific, London, GB; 1994.

* cited by examiner

*Primary Examiner* — Edmund H. Lee
(74) *Attorney, Agent, or Firm* — Colin P. Cahoon; Carstens & Cahoon, LLP

(57) ABSTRACT

There is disclosed a method for producing a molded plastic product having an outer skin and in inner core. The method is particularly suitable for making structural products such as panels or the like from recycled plastic material. The method comprises the steps of: providing a mold having a mold cavity; forming an outer skin from a first plastic material on at least two opposed surfaces inside the mold cavity; forming an inner core from a second plastic material inside the mold cavity; and at least partially curing the plastic materials to form a molding inside the mold cavity via the application of heat. The method is characterised by the subsequent steps of (optionally pre-cooling the molding and then) simultaneously cooling the molding and compressing the molding so as to reduce its size in at least one dimension to a desired dimension of the finished product.

15 Claims, 10 Drawing Sheets

METHOD FOR PRODUCING A MOULDED PLASTIC PRODUCT

The present invention relates to a moulding method, and more particularly relates to a moulding method for producing a moulded product having an outer skin and an inner core.

It has been proposed previously to produce rigid plastic structures, such as panels for use in the construction industry, from recycled plastic material. As will be appreciated, the ability to make use of recycled plastics material has many benefits for the environment.

Previously proposed methods for producing panels or other structural members from recycled plastic material include so-called powder injection methods (PIMs) which use open moulds comprising two discrete mould parts. Initially an outer skin is formed on each mould part by heating the mould parts and then spraying them with powdered plastic material. The heat of each mould part melts the powdered material, causing it to adhere to the mould parts in the form of a thin skin. Thereafter, one of the two mould parts is covered with a second powdered plastic material including a blowing agent, and the two mould parts are then brought together to form a closed mould cavity, and the entire mould is then placed inside a curing oven. The second material expands inside the mould during curing in the oven, and thus forms an expanded inner core inside the outer skin. When curing is complete, the mould parts are broken apart and the product removed from the mould.

The above-mentioned open mould method has disadvantages, arising from the supporting structures necessary to turn and manipulate the mould parts. These structures are often very significant and they need to be placed inside the oven along with the mould parts, meaning that a high proportion of the heat energy produced by the oven is wasted in heating the supporting structure. Also, problems arise due to the sheer size of oven that is required for such a method; large ovens generally being less efficient than smaller ones.

Alternative moulding methods have therefore been proposed in order to address these, and other problems associated with powder injection open mould methods. One such method involves the use of a mould having an internal cavity. Initially, an outer skin is formed by filling the mould with a first particulate material and heating the mould until a thin skin of melted particulate is formed on the inside surfaces of the mould, with the remainder of the particulate material in a central region of the mould remaining unmelted. This unmelted particulate material is then removed from the mould cavity. A second, inner skin, of another particulate material is then formed inside the outer skin via a similar technique. However, the material used to form the inner skin includes a blowing agent, and so after the unmelted particulate has been removed from the central region of the mould cavity, leaving a central void behind, the mould is subsequently heated to an elevated temperature whereupon the remaining inner skin expands to fill the void and hence form an expanded inner core inside the outer skin.

Although the above-described moulding method goes some way to addressing the aforementioned problems with the open mould method, the resulting moulded products can often be of inadequate quality and integrity for use in construction. For example, when used to produce panels from recycled plastic material, this method of the prior art can result in panels having unacceptable internal voids which can significantly reduce the strength and integrity of the panel. The method also fails to produce panels which are flat, or sufficiently flat for many construction uses.

It is an object of the present invention to provide an improved method for producing a moulded plastic product having an outer skin and an inner core.

According to the present invention, there is provided a method for producing a moulded plastic product having an outer skin and in inner core, the method comprising the steps of: providing a mould having a mould cavity; forming an outer skin from a first plastic material on at least two opposed surfaces inside the mould cavity; forming an inner core from a second plastic material inside the mould cavity; and at least partially curing the plastic materials to form a moulding inside the mould cavity via the application of heat, the method further comprising the subsequent steps of simultaneously cooling the moulding and compressing the moulding so as to reduce its size in at least one dimension to a desired dimension of the finished product.

Preferably, the moulding is removed from said mould cavity prior to the simultaneous steps of cooling and compressing.

Advantageously, said simultaneous steps of cooling and compressing are performed in a press having a cooling arrangement configured to cool the moulding whilst in the press.

Conveniently, said press is a fluid-cooled hydraulic press.

Preferably, said press comprises a pair of platens, each having a series of channels formed therein for the flow of coolant.

Advantageously, the cooling step is effective to reduce the temperature of the moulding from over 200° C. to under 40° C.

Conveniently, the cooling step is effective to reduce the temperature of the moulding from approximately 200° C. to approximately 40° C.

Preferably, said cooling step continues for approximately 20 minutes.

Advantageously, the compressing step is effective to reduce said dimension by at least 20%.

Conveniently, the compressing step comprises applying a pressure of at least 150 N/cm$^2$ to the moulding for the substantially the entire duration of the cooling step. Preferably, the pressing force is approximately 190 N/cm$^2$.

Preferably, said step of forming the outer skin comprises filling the mould cavity with said first plastic material in particulate form, heating the mould to form a skin of melted particulate against said at least two opposed mould surfaces, and removing un-melted particulate from the mould cavity once a desired thickness of skin has been formed on said surfaces.

Advantageously, said step of removing un-melted particulate from the mould cavity is performed by opening an outlet aperture formed in a lower part of the mould, and permitting the un-melted particulate material to fall through the outlet aperture under gravity. Alternatively, the mould may be tilted slightly to pour out the un-melted material.

Conveniently, said aperture outlet aperture is subsequently closed after removal of the un-melted particulate material, ready for the receipt of said second plastic material in the mould cavity.

Preferably, said step of filling the mould cavity with said first plastic material involves pouring said material in particulate form through an inlet aperture formed in an upper part of the mould, and subsequently closing said inlet aperture.

Advantageously, said step of forming the inner core comprises filling the mould cavity with said second plastic material in particulate form after the formation of the outer skin on said at least two opposed surfaces, and heating the mould to at least partially cure substantially the entire volume of said second material inside the mould cavity.

Conveniently, said step of filling the mould cavity with said second plastic material involves pouring said material in particulate form through an inlet aperture formed in an upper part of the mould, and subsequently closing said inlet aperture.

Preferably, the mould is held at an internal temperature of at least 200° C. for a period of at least 5 minutes.

Advantageously, the method further comprises the step of cooling the mould prior to removal of the moulding.

Conveniently, at least one of said first and second materials comprises recycled High Impact Polystyrene (HIPS).

At least the first material may additionally comprise a dye pigment.

The first and second materials may optionally include a fire-retardant additive.

The first and second materials may optionally be substantially identical.

Preferably, the second material comprises recycled polyethylene. For example, the second material may comprise approximately 75% by weight recycled HIPS and approximately 25% recycled polyethylene. The addition of polyethylene can help to reduce the melting point of the material, preferably down to approximately 140° C.

Optionally, second plastic material may comprise a blowing agent.

It has been found that a moulding method in accordance with the type defined above is effective to produce very high quality flat or shaped panels from recycled plastic materials. The resulting panels are waterproof and can be made fire-resistant in a variety of thicknesses and colours for a multitude of different uses such as, for example: shelving; flood plane use; panelling for the building industry; prefabricated building use; and military use.

So that the invention may be more readily understood, and so that further features thereof may be appreciated, embodiments of the invention will now be described by way of example with reference to the accompanying drawings in which.

The method of the present invention will now be described in detail, with particular reference to the production of substantially flat panels from recycled plastic material. However, it is to be appreciated that the method of the present invention can be used to produce moulded products of other shapes or configurations.

Figure 1:
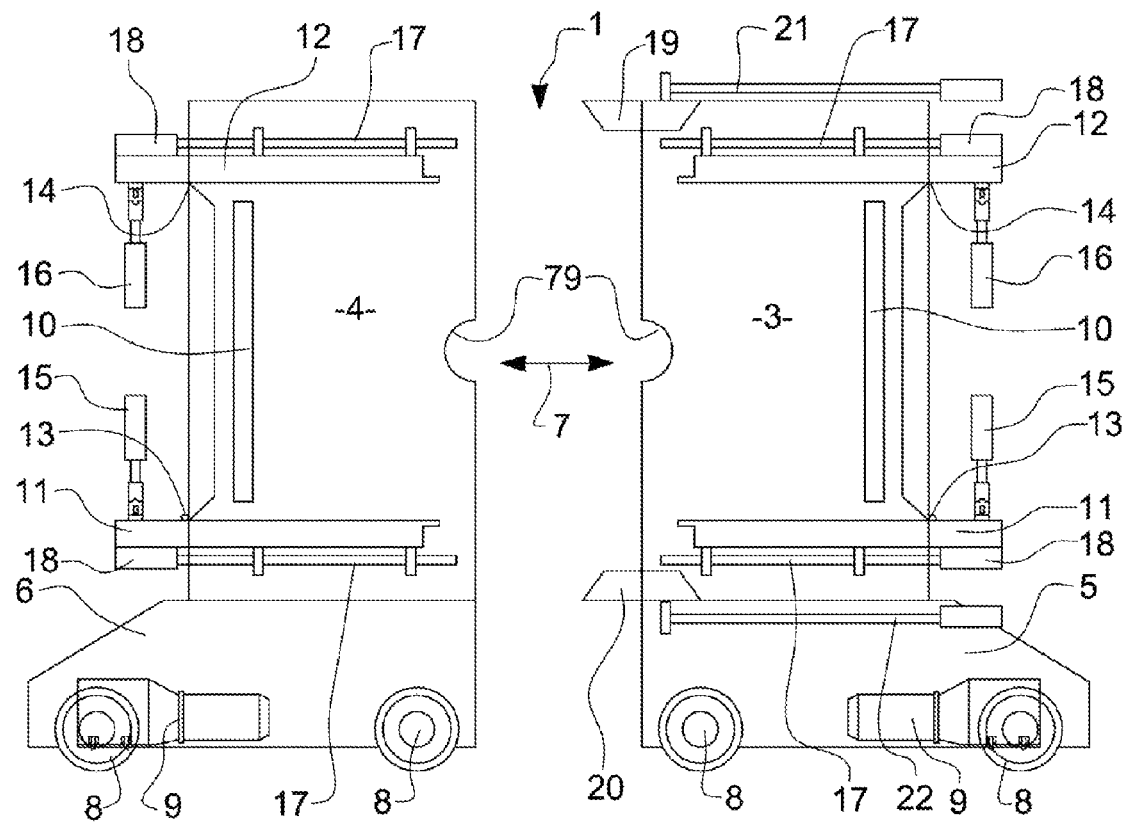
FIG. 1 is an end view of an oven used in accordance with the method of the present invention, the oven being shown in an open configuration ready to receive a mould.
Figure 2:
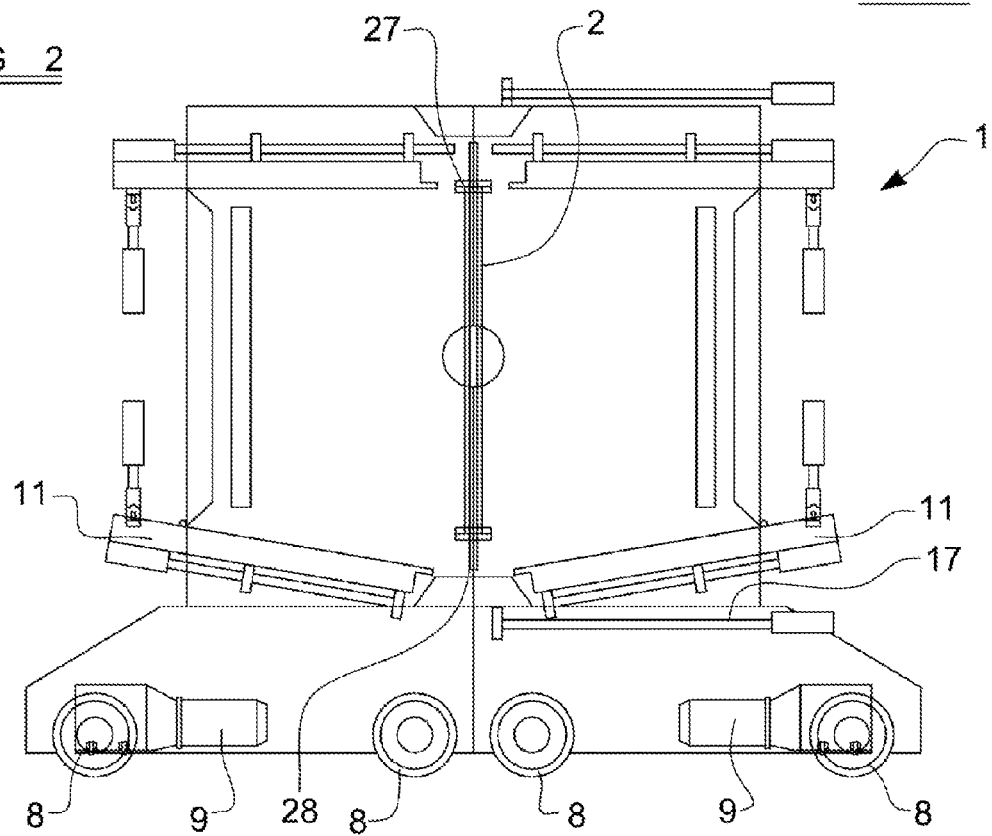
FIG. 2 is an end view showing the oven of FIG. 1 in a closed configuration in which it contains a mould.
Figure 3:
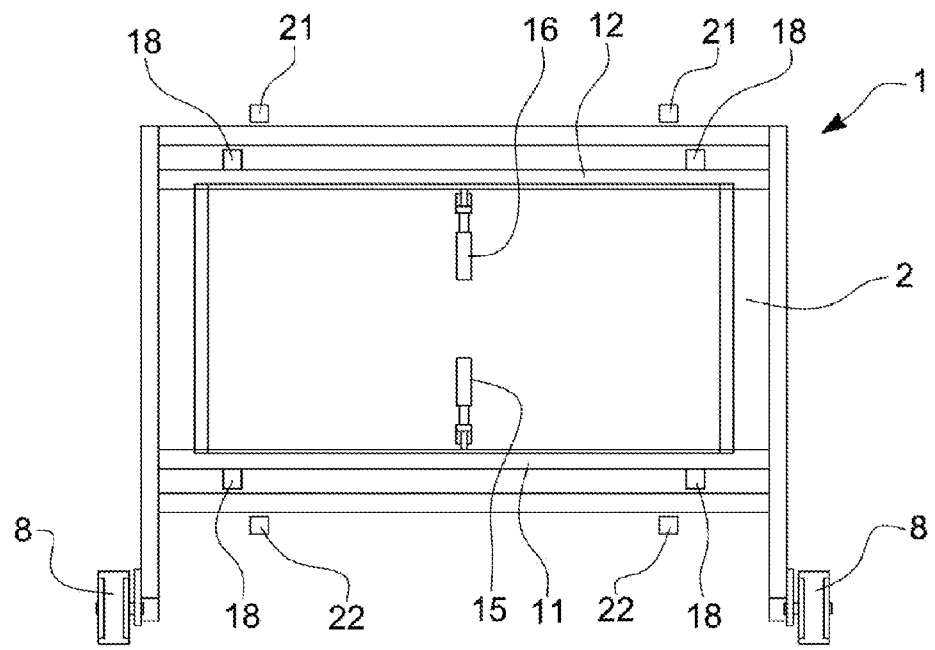
FIG. 3 is a side view of the oven of FIGS. 1 and 2.

FIGS. 1 to 4 show an oven 1 and a mould 2 of a type suitable for use in the method of the present invention. Having particular regard to FIG. 1, the oven 1 comprises two parts 3, 4, each of which comprises a housing mounted on a respective carriage 5, 6 for movement towards and away from one another as depicted by arrow 7. The oven is shown in FIG. 1 in an open configuration in which the two mould parts 3, 4 are separated and spaced from one another to permit the insertion or removal of the mould. FIG. 2 shows the oven in a closed configuration in which the two parts 3, 4 engage such that their respective housings cooperate to form a generally closed oven chamber around the mould 2.

The carriages 5, 6 supporting each mould part are provided with wheels 8 for rolling movement along the ground (for example on cooperating rails) between their open and closed positions by the operation of electric motors 9 which are each arranged to drive at least one wheel 8.

Each oven part 3, 5 is provided with a heat source. The heat source may comprise one or more burners 10 positioned within the oven chamber. Gas powered infra-red burners may be used, although it is to be appreciated that other types of burner or heater could be used instead.

Each oven part 3, 5 is additionally provided with a respective lower door 11 and an upper door 12. The lower and upper doors 11, 12 are provided in the form of flaps mounted for pivotal movement about respective pivots 13, 14 between generally horizontal positions as illustrated in FIG. 1, and tilted positions. FIG. 2 shows the lower door flaps 11 in their tilted positions in which it can be seen that the two door flaps extend generally downwardly from their pivots towards one another. Although not illustrated, it is to be appreciated that the upper door flaps 12 may be moved about their pivots to upwardly tilted positions in which they extend generally upwardly from their pivots towards one another. Each door flap 11, 12 is moved between its horizontal and tilted positions by a respective actuator in the form of a hydraulic or pneumatic cylinder 15, 16.

Each door flap 11, 12 carries a mould closure rod 17 mounted for sliding movement along the door flap. The closure rods 17 are moved by respective actuators 18 mounted to the door flaps, the actuators preferably taking the form of hydraulic or pneumatic cylinders.

One of the two mould parts 3 is additionally provided with top and bottom shut-off members 19, 20. FIGS. 1 and 2 both show the two shut-off members 19, 20 in closed positions in which they project outwardly from the mould part 3 on which they are provided. As will be seen from FIG. 2, when the two mould parts 3, 4 are positioned adjacent one another around the mould 2 and the shut-off members 19, 20 are in their closed positions, the shut-off members extend across above and below the mould 2 respectively. However, each shut-off member is moveable relative to the housing of the mould part 3 on which they are provided, and can be retracted from their closed positions illustrated to open positions in which they do not project significantly from the housing and hence will not extend above or below the mould when the oven is closed as illustrated in FIG. 2.

Figure 4:
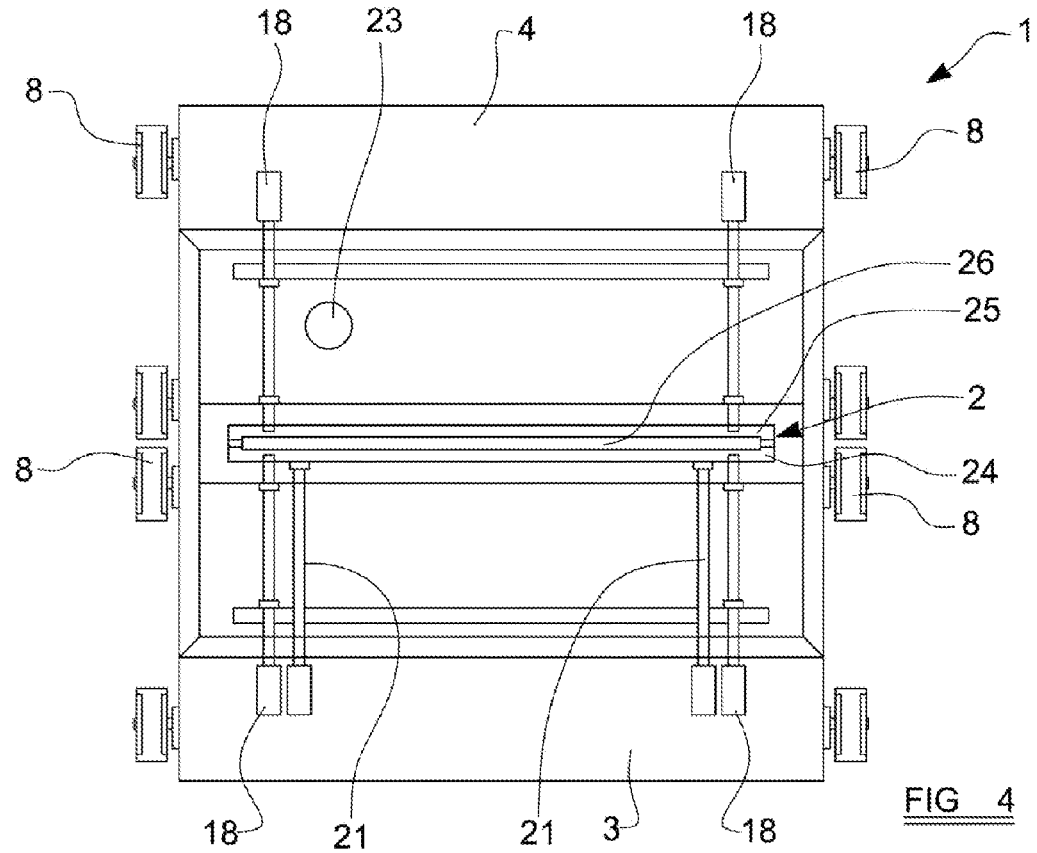
FIG. 4 is a plan view of the oven from above, showing the oven in the closed configuration of FIG. 2.
Figure 5:
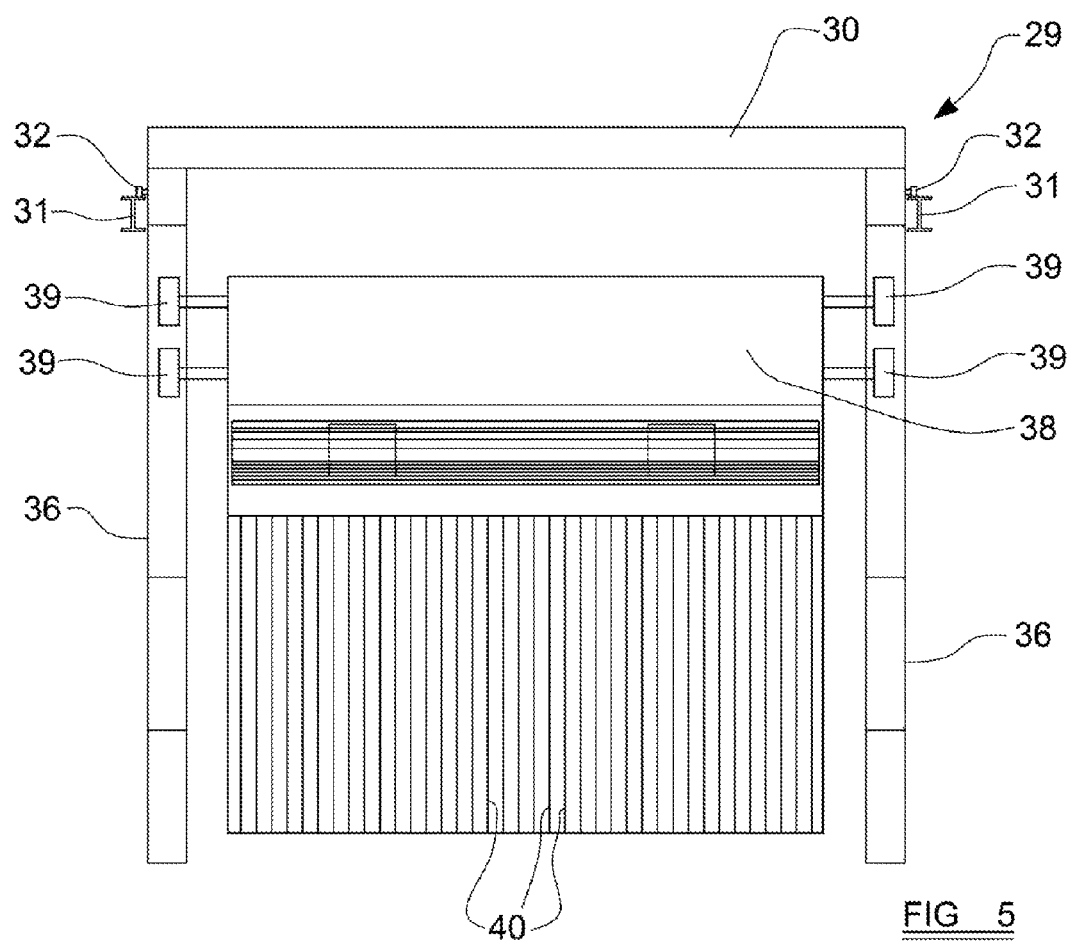
FIG. 5 is a side view of a filling hopper which is used to fill the mould with particulate material.
Figure 6:
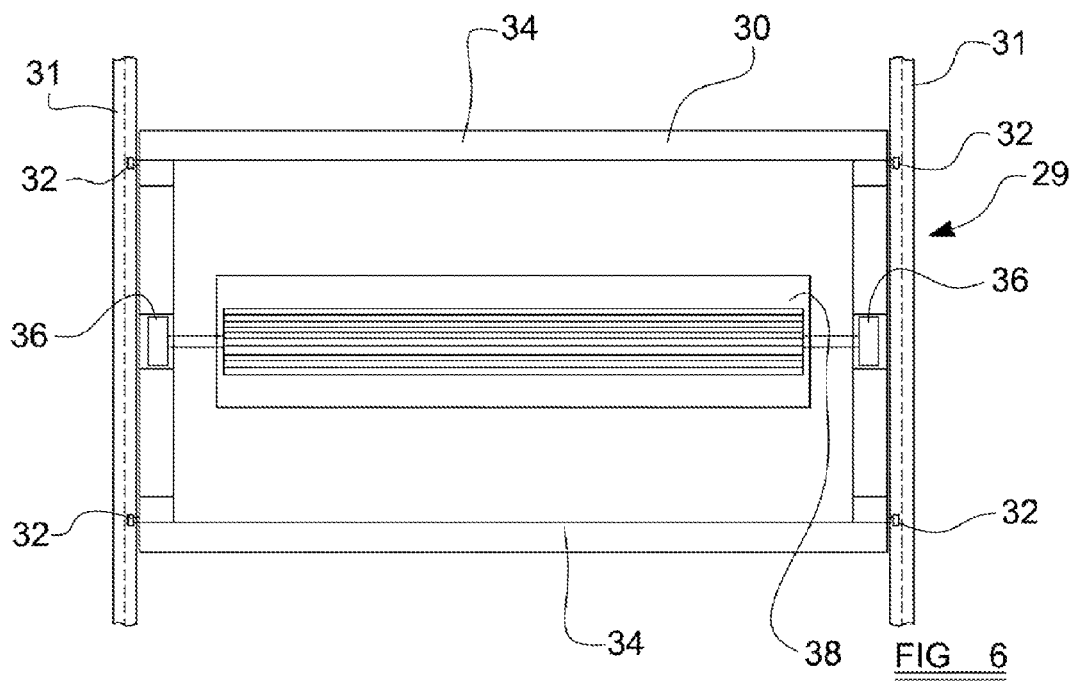
FIG. 6 is a plan view from above of the filling hopper.

As illustrated in FIG. 4, the housing of at least one of the mould parts 4 is provided with an exhaust outlet 23 in an upper part, the exhaust outlet permitting the exhaust of hot gas from inside the oven chamber. The exhaust outlet 23 is connectable to an exhaust pipe or duct (not shown).

The mould 2 is illustrated most clearly in FIGS. 2 and 4. As will be appreciated, the mould is shaped and configured for use in moulding a substantially flat planar panel. The mould comprises a pair of mould parts 24, 25 which are releasably connectable to one another to define a mould cavity 26 therebetween. The inner surfaces of the mould cavity 26 are preferably coated with a high temperature non-stick coating. Although not illustrated, it is envisaged that the mould 2 may be configured to be adjustable in thickness to vary the size of the mould cavity 26, thereby facilitating the moulding of panels of different thickness. For example, it is proposed to provide spacers of various sizes for insertion between the mould parts 24, 25.

As illustrated in FIGS. 2 and 4, the mould 2 is shown in a moulding position in which it is oriented substantially vertically within the oven chamber, at the interface between the two oven parts 3, 4. The mould 2 is configured to be selectively opened at the top and at the bottom when oriented in this manner, and so is provided with top and bottom closures 27, 28. The closures 27, 28 may take the form of pivotally mounted flaps. The closures are arranged for movement between their open and closed positions by the closure rods 17 and associated actuators 18 mounted to the door flaps when the doors flaps are in their horizontal, un-tilted, positions.

FIGS. 5 to 8 illustrate a hopper arrangement 29 which is used to fill the mould 2 with particulate material, in a manner which will be described in more detail below. The hopper arrangement comprises a support frame 30 extending between a pair of horizontal rails 31. The support frame 30 is moveable along the rails 31 via a plurality of small wheels 32 which engage and roll along the rails.

The support frame 30 comprises a pair of spaced apart end frames 33 which are interconnected by a pair of transverse beams 34. As shown most clearly in FIGS. 7 and 8, the end frames 33 are generally triangular in form comprising a horizontal member 35, a central vertical member 36, and a pair of diagonal bracing members 37. The central vertical members 36 take the form of elongate channels having a generally C-shaped cross-section, the two channels being arranged so that their open sides face one another across the span between the two rails 31.

Figure 7:
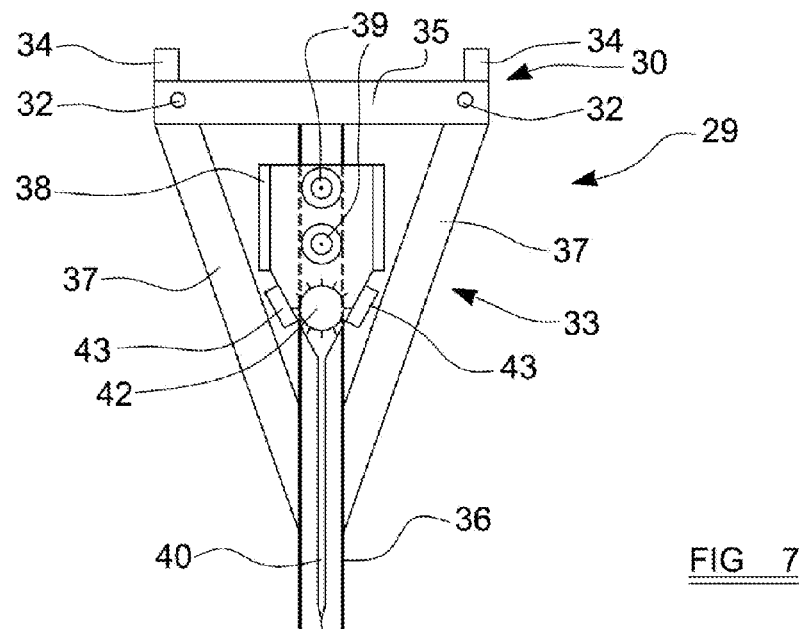
FIG. 7 is an end view of the hopper in a raised position.
Figure 8:
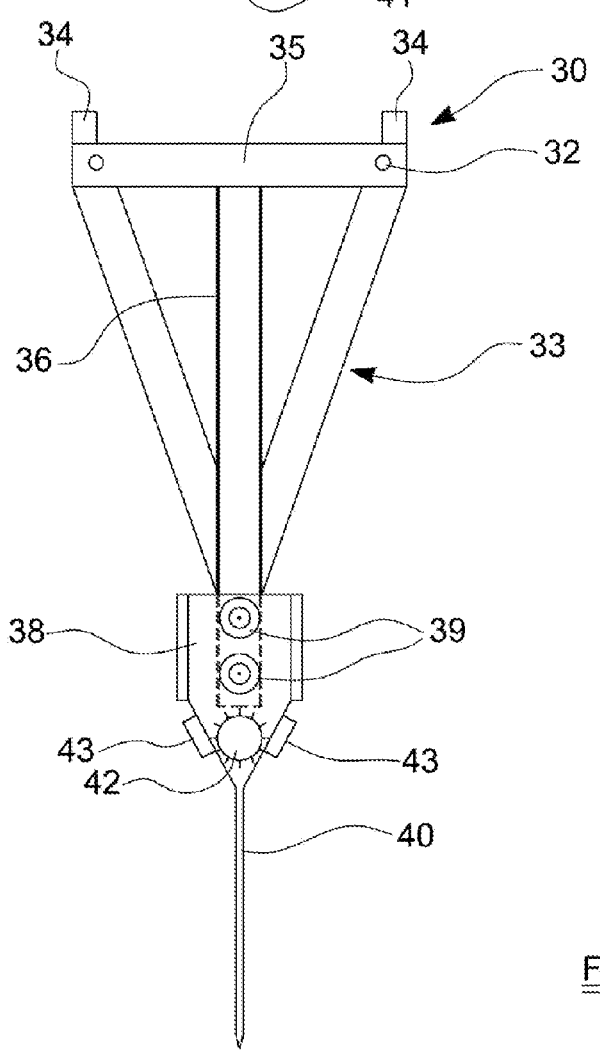
FIG. 8 is a view corresponding to that of FIG. 7, but which shows the hopper in a lowered position for filling the mould.

A filling hopper 38 is supported between the two end frames 33. The hopper is configured to hold and dispense particulate material and so has a downwardly tapering form as is conventional. The hopper 38 is arranged for vertical movement between the two end frames 33, and for this purpose has a pair of wheels 38 rotatably mounted at each end, the wheels 38 being arranged vertically one above the other. The wheels 38 are configured to be received within and to run along the C-shaped channels defined by the vertical members 36 of the two end frames 33. The wheels 38 thus cooperate with the vertical members 36 to guide the hopper 38 for vertical movement between a raised position as illustrated in FIG. 7 and a lowered position as illustrated in FIG. 8.

The hopper 38 has a plurality of elongate dispensing tubes 40 which extend vertically downwardly from the narrow lower region of the hopper. The dispensing tubes are arranged in a side-by-side array along the entire length of the hopper and each has a bore sized to permit the substantially free-flow of particulate material. Each tube terminates with an open dispensing aperture 41 at its lowermost free end.

The flow of particulate material from the chamber of the hopper and down the dispensing tubes 40 is controlled by a rotary valve 42. To help prevent against the particulate material becoming clogged in the hopper chamber of the dispensing tubes, the hopper is provided with a pair of vibrators 43 in a lower region of the hopper, slightly above the dispensing tubes.

Figure 9:
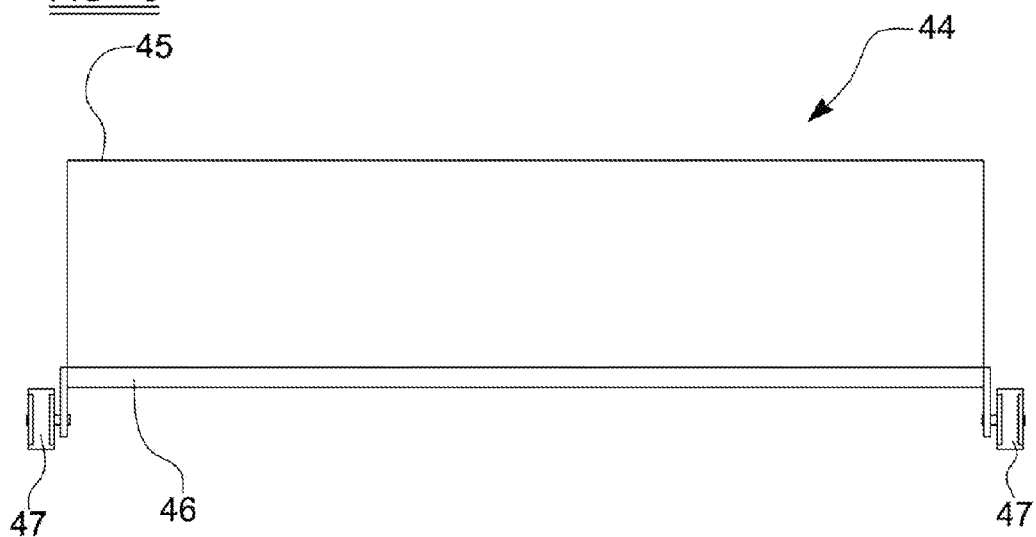
FIG. 9 is a side view of a collection hopper used in the method of the invention to collect unused particulate material from the mould.
Figure 10:
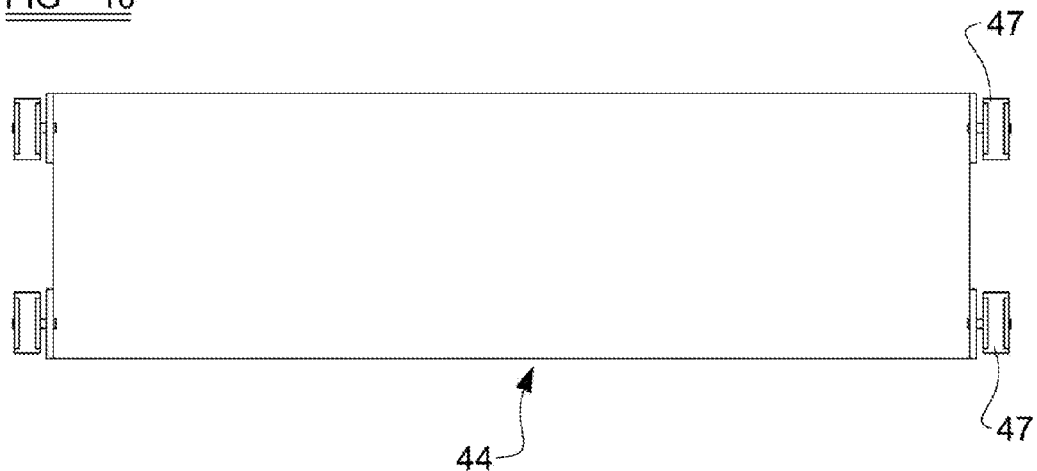
FIG. 10 is a top plan view of the collection hopper of FIG. 9.
Figure 11:
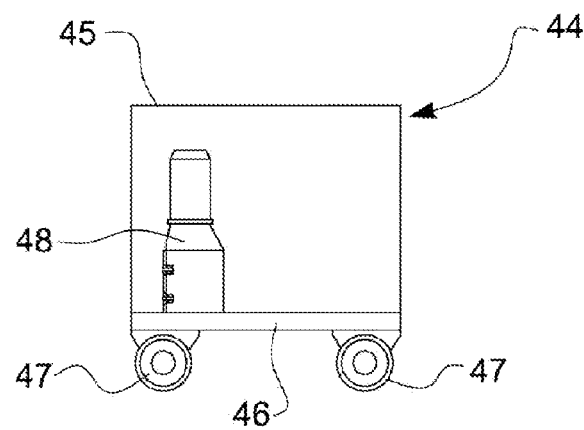
FIG. 11 is an end view of the collection hopper of FIGS. 9 and 10.

FIGS. 9 to 11 illustrate a collection hopper 44 which is used in the method of the invention to collect unused particulate material from the mould 2 in a manner which will be explained in more detail below. The collection hopper comprises an upwardly open elongate rectangular housing 45 which is mounted on a carriage 46 having wheels 47 for rolling movement along the ground, for example along cooperating rails (not shown). In a preferred arrangement, the collection hopper 44 is self-propelled, and may thus comprises an electric motor 48 arranged to drive at least one of the wheels 47.

FIGS. 12 to 16 illustrate a carriage arrangement 49 configured to support, carry and manipulate the mould 2. The carriage arrangement comprises a trolley 50 which is configured for self-propelled movement via wheels 51 and a motor 52.

The trolley 50 comprises a support frame 53 which supports a shaft 54 for rotation in bearings 55 about a horizontal axis 56 spaced above the wheels. The support frame 53 also supports a motor 57 which is operatively connected to the shaft 54 via a gearbox 58, the motor thus being operable to rotate the shaft 54 in the bearings 55.

Figure 12:
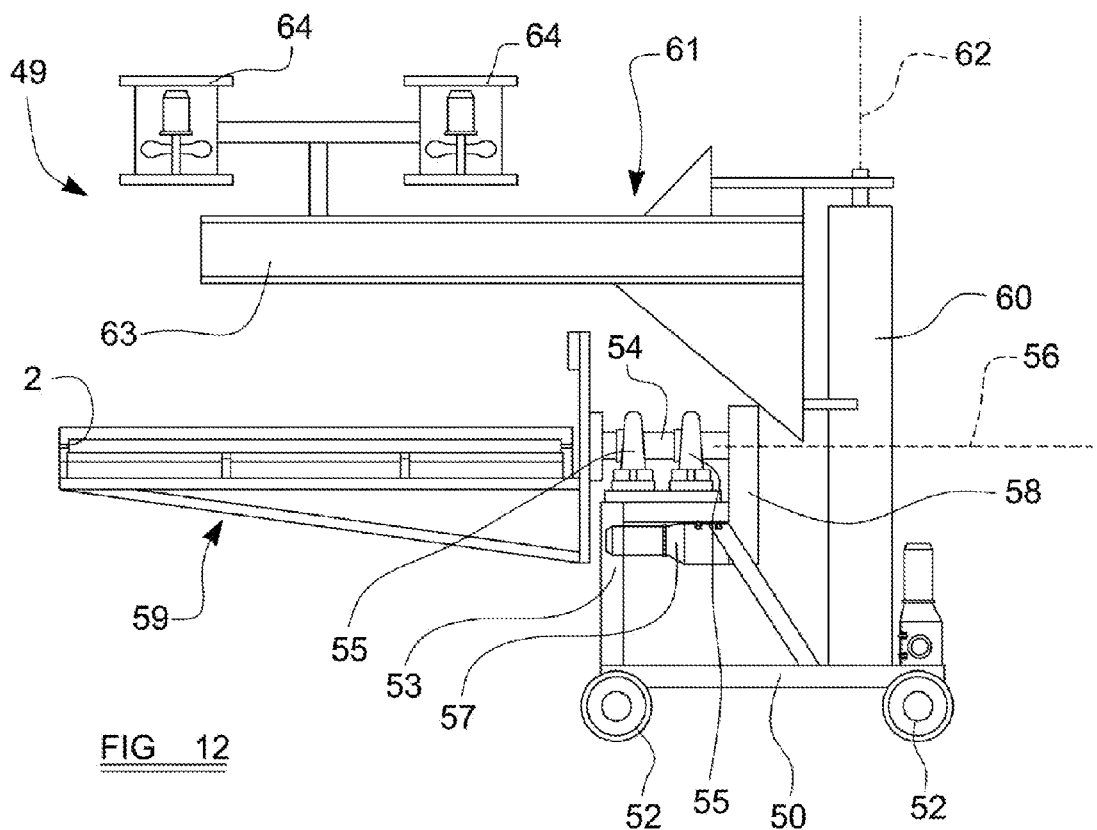
FIG. 12 is a side view of a mould carriage used in the method of the present invention.
Figure 13:
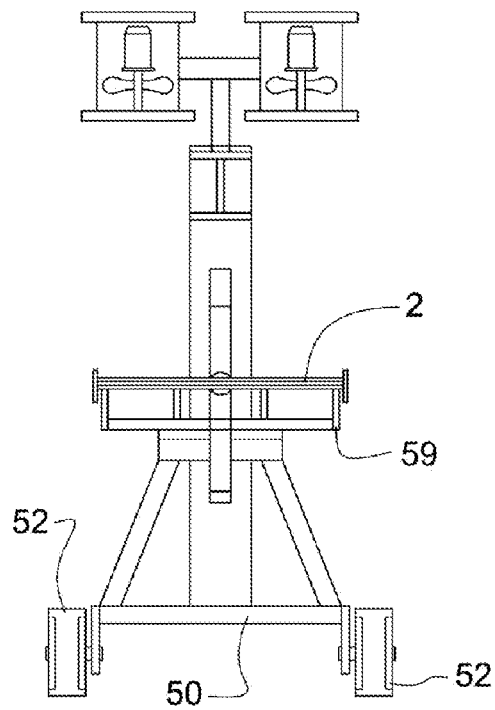
FIG. 13 is an end view of the mould carriage, showing the mould carriage supporting a mould in a substantially vertical orientation.
Figure 14:
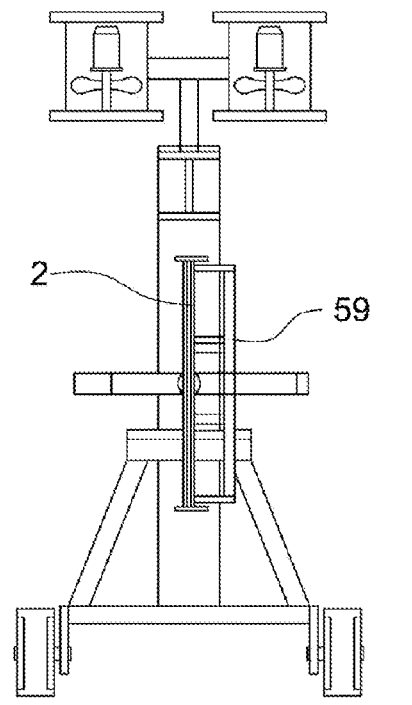
FIG. 14 is a view corresponding generally to that of FIG. 13, but which shows the mould carriage in an alternate position in which the mould is supported in a substantially horizontal orientation.
Figure 15:
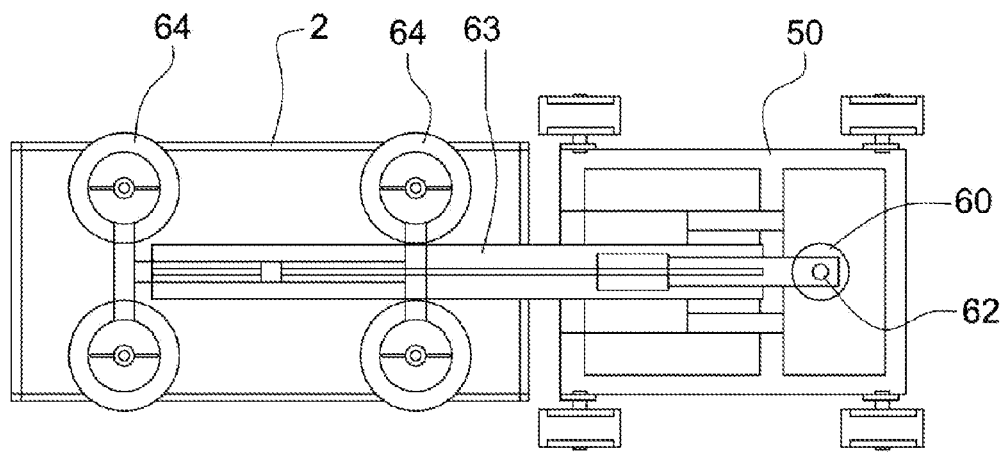
FIG. 15 is a top plan view of the mould carriage showing a fan arrangement positioned above the mould.

The shaft 54 supports a cantilever support frame 59 for co-rotation therewith, the cantilever frame extending outwardly from the trolley 50 in spaced relation to the ground. The cantilever frame 59 is configured to support the mould 2, and is shown in FIGS. 12 and 13 supporting the mould 2 in a substantially horizontal orientation. However, via operation of the motor 57, the shaft 54 and the cantilever frame 59 can be rotated about the axis 56 so as to support the mould 2 in vertical orientation as previously illustrated in FIGS. 2, 3 and 4. The cantilever frame 59 is shown in this orientation in FIG. 14. As will be noted, the cantilever nature of the frame 59 means that regardless of the orientation of the frame and the mould, there is always free space beneath the frame and mould. As will be explained in more detail, this free space is sufficient to permit the collection hopper 44 to move beneath the mould 2 when in its vertical orientation illustrated in FIG. 14.

Figure 16:
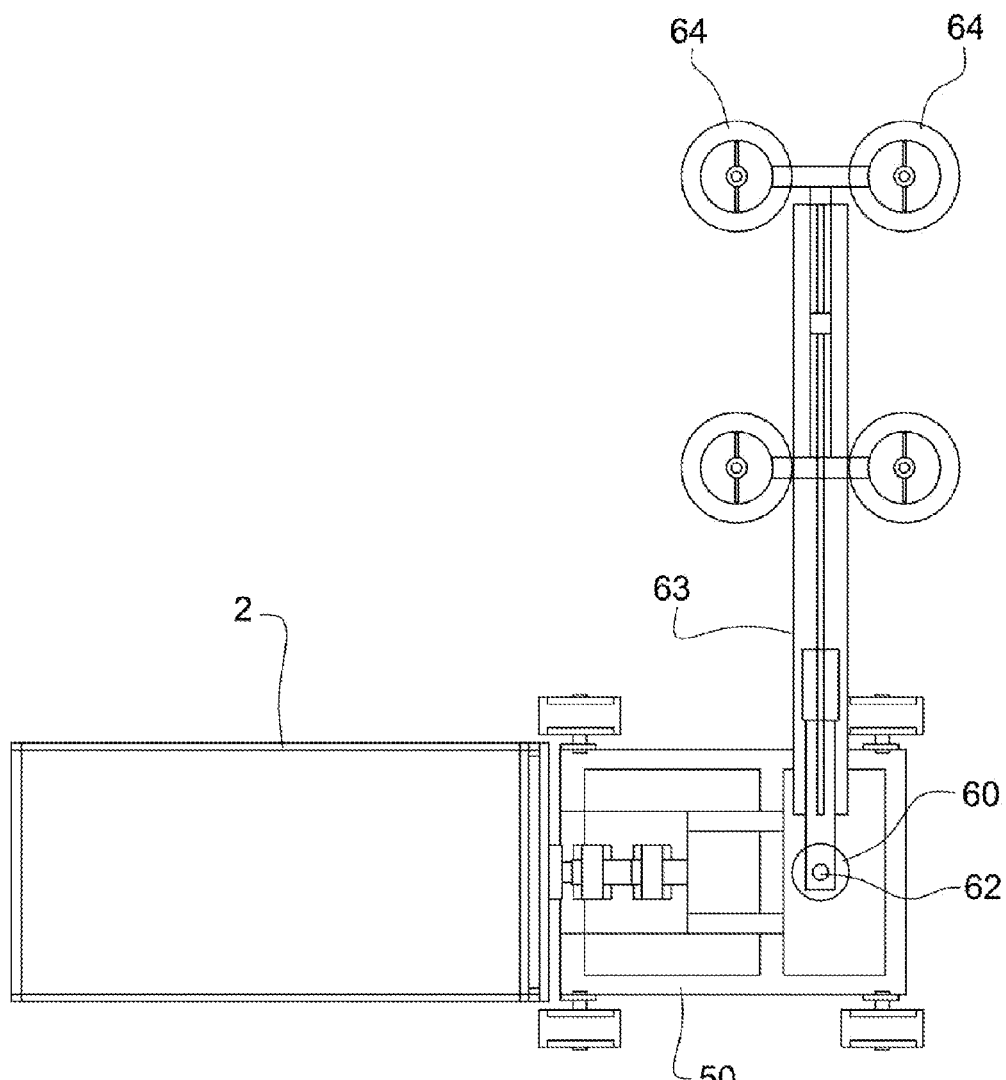
FIG. 16 is a view corresponding generally to that of FIG. 15, but which shows the fan arrangement in an alternate position in which has been moved substantially clear of the mould.

The trolley 50 also carries an upstanding post 60. The post 60 supports a gantry 61 for rotation about the vertical axis 62 of the post. The gantry 61 comprises a beam 63, such as an I-section beam in the case of the particular embodiment illustrated. The beam 63 supports an array of cooling fans 64 arranged to direct a cooling flow of air in a generally downwards direction. The cooling fans 64 are preferably provided in the form of ducted units, and may be provided with a supply of water or other liquid coolant so as to produce a fine cooling mist. FIGS. 12 to 15 all show the gantry 61 and cooling fans 64 positioned vertically above the mould 2 supported by the cantilever frame 59. However, FIG. 16 illustrates the gantry and the cooling fans having been rotated about the axis 62 by approximately 90 degrees such that they are substantially clear of the mould 2.

Figure 17:
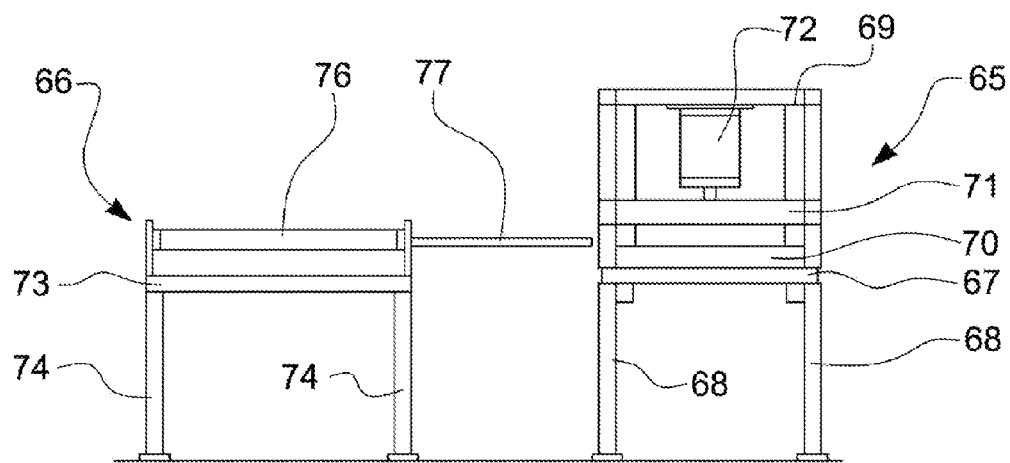
FIG. 17 is an end view of a pushing and pressing arrangement used in the method of the present invention.
Figure 18:
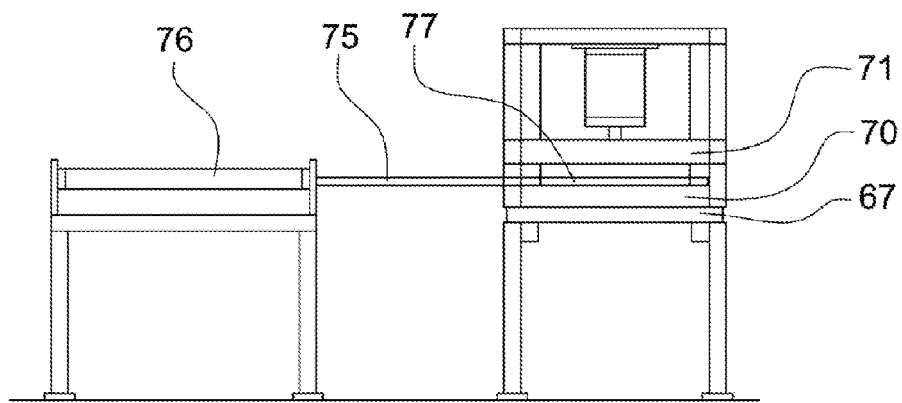
FIG. 18 is a view corresponding generally to that of FIG. 17, but which shows the pusher arrangement in an actuated position effective to push the mould into the press arrangement.
Figure 19:
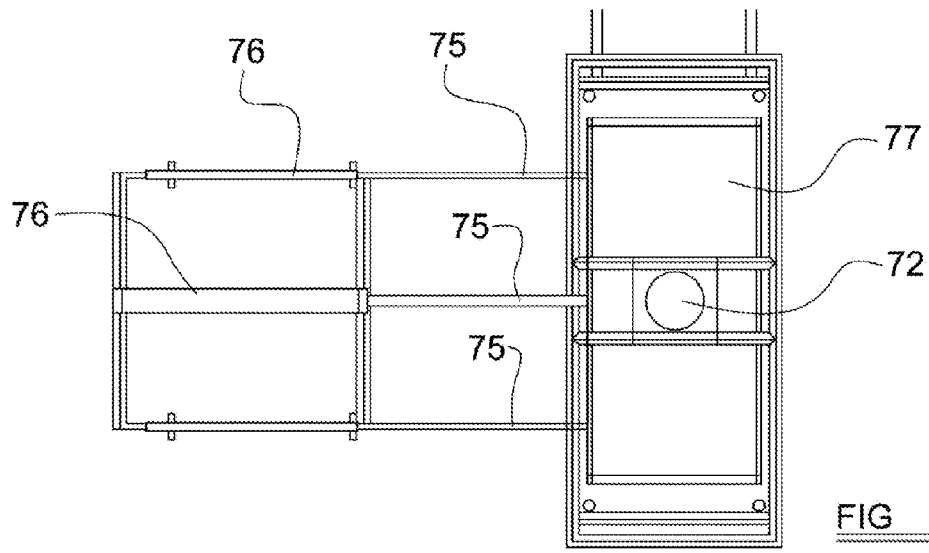
FIG. 19 is a top plan view of the pushing and pressing arrangement in the position illustrated in FIG. 18.

FIGS. 17 to 19 illustrate a pressing arrangement 65 and a pusher arrangement 66. The pressing arrangement comprises a pressing table 67 which is supported above the ground by a plurality of legs 68. The table 67 supports a hydraulic or pneumatic press 69 comprising a lower fixed platen 70 and an upper moveable platen 71. The two platens 70, 71 are made of steel and are preferably substantially planar for use in producing a substantially flat panel. The or each platen may have a relief pattern formed in its pressing surface so as to impress a corresponding pattern into the outer surfaces of a panel to be formed therebetween, as will be described in more detail below.

The platens 70, 71 each have internal fluid channels for the flow of water or other liquid coolant, and are thus chilled, or at least cooled by a supply of coolant.

The upper moveable platen 71 is mounted for vertical sliding movement under the action of a hydraulic or pneumatic cylinder 72, the cylinder thus being operable to press the upper platen 71 downwardly towards the lower platen 70. The pressing cylinder is configured to apply very high pressing forces to the upper platen 71, for example pressing forces in excess of 100 tonnes.

The pusher arrangement 66 is located generally adjacent to, but spaced from the pressing arrangement, and similarly comprises a table 73 supported above the ground by a plurality of legs 74. The table supports horizontal pushing rods 75 which are hydraulically or pneumatically slideable within corresponding cylinders 76, between retracted positions as illustrated in FIG. 17, and extended positions as illustrated in FIGS. 18 and 19 in which the pushing rods 75 extend across the gap between the pusher table 73 and the pressing table 67. In FIG. 17, a moulding 77 is shown positioned between the pusher 66 and the press 65. In FIGS. 18, and 19, the moulding 77 is shown having been pushed horizontally by the pushing rods so as to become positioned between the platens 70, 71, and more particularly resting on the lower platen 70.

Figure 20:
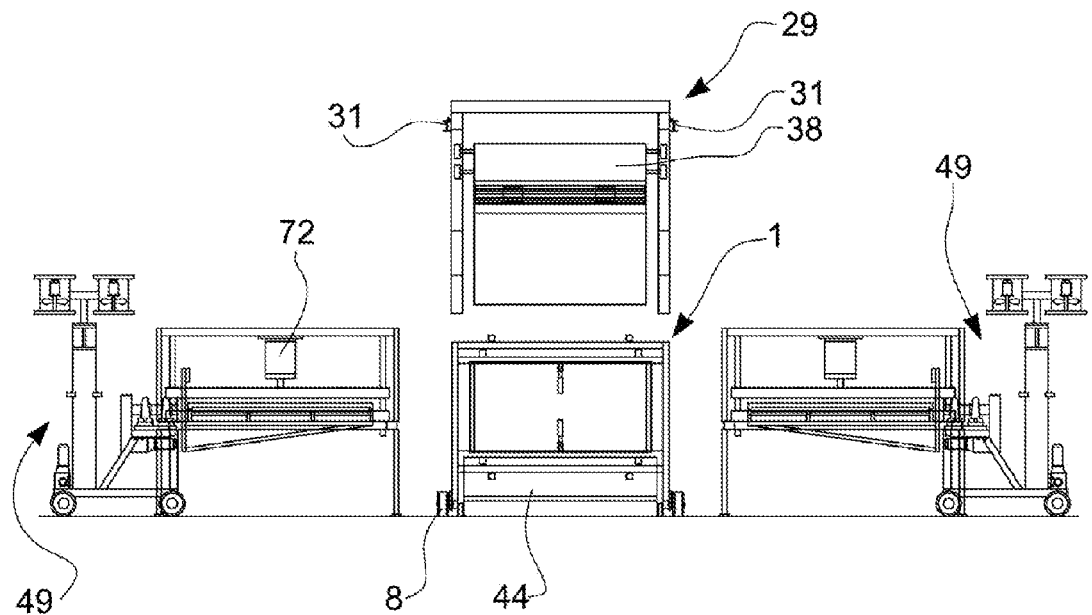
FIG. 20 is a side view of an entire apparatus used in the method of the present invention.
Figure 21:
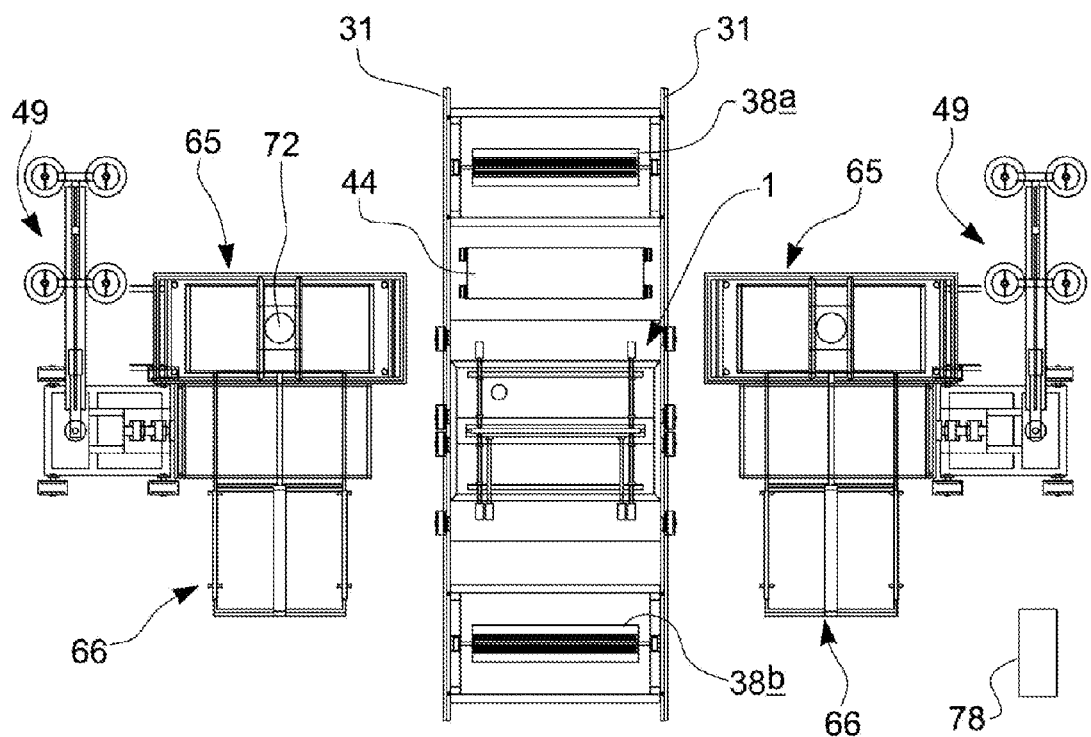
FIG. 21 is a top plan view from above of the apparatus illustrated in FIG. 20.
Figure 22:
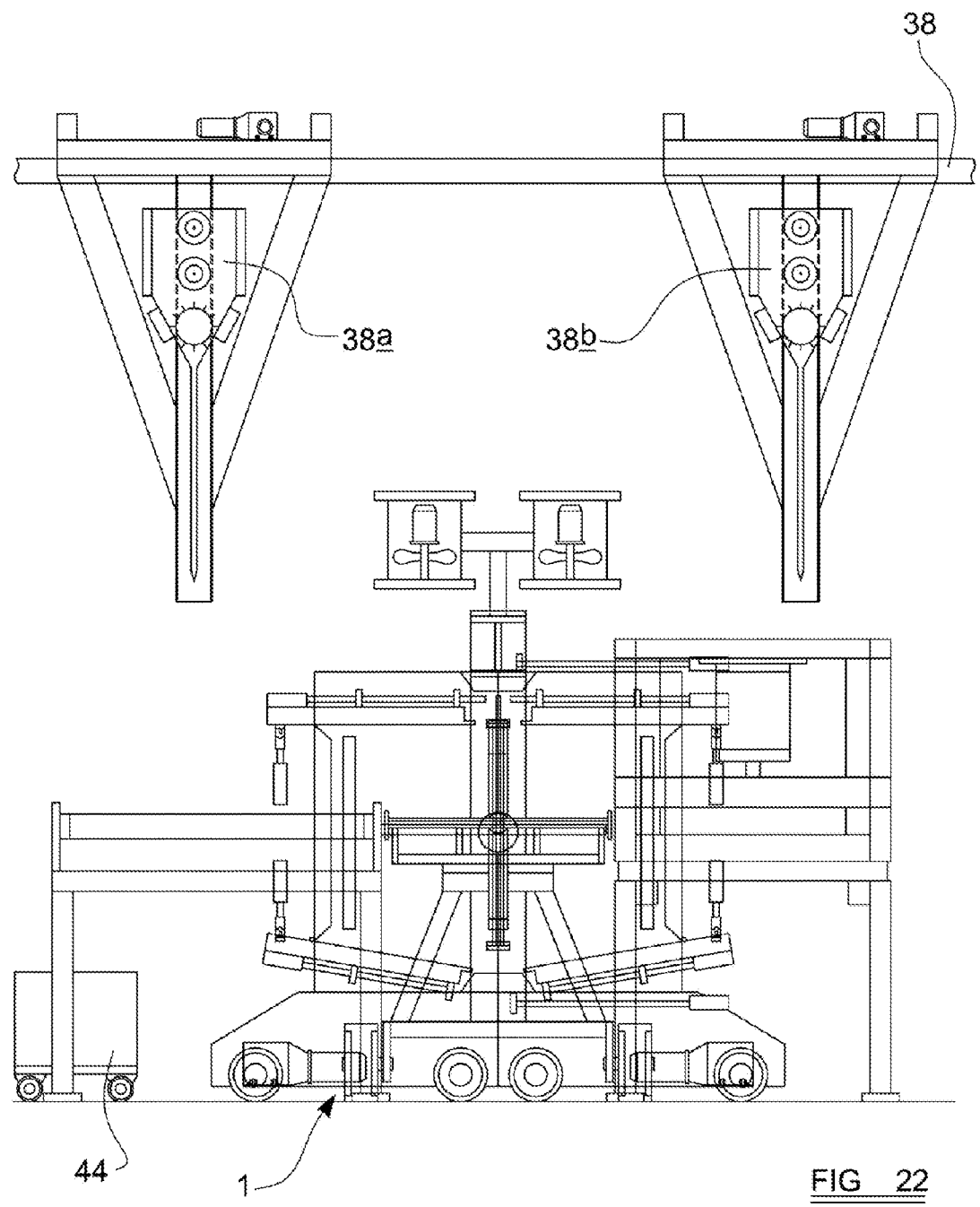
FIG. 22 is an end view of the apparatus shown in FIGS. 20 and 21.

The method of the present invention will now be described with reference to FIGS. 20 to 22, illustrating a substantially complete system of apparatus comprising the various components described above and illustrated in FIGS. 1 to 19.

As will be noted with particular reference to FIGS. 20 and 21, the oven 1 is positioned generally centrally, below the filling hopper arrangement 29. The rails 31 of the hopper arrangement are supported above the oven 1, and are arranged so as to be substantially parallel to the direction in which the two oven parts 3, 4 are arranged to move along the ground.

As illustrated most clearly in FIGS. 21 and 22, the hopper arrangement 29 actually comprises two discrete filling hoppers 38a, 38b with respective associated end frames 33 etc., both filling hoppers 38a, 38b being arranged to move along the same rails 12.

The first filling hopper 38a is filled with a first particulate material for use in forming the outer skin of a panel product to be moulded via the method of the present invention. The first particulate material comprises recycled plastic material, and preferably consists substantially entirely of recycled plastic material. The recycled plastic material preferably comprises High Impact Polystyrene (HIPS), and may optionally include a die and/or a fire-retardant additive. The grain size of the first particulate material is not thought to be of significant importance to the method, providing that the material can be poured and can flow down the dispensing tubes 40 of the hopper 38a.

The second filling hopper 38b is filled with a second particulate material for use in forming an inner core of a panel product to be moulded via the method of the present invention. The second particulate material also comprises recycled plastic material, and preferably consists substantially entirely of recycled plastic material. The recycled plastic material preferably comprises High Impact Polystyrene (HIPS), and may optionally include a fire-retardant additive and/or a blowing agent. It is considered preferable for the second particulate material to comprise both HIPS and recycled polyethylene (PE), most preferably in a ratio by weight of 75% HIPS to 25% PE. The addition of PE to the HIPS serves to reduce the melting point of the material. It has been found that a melting point in the region of approximately 140° C. is preferable. Again, the grain size of the second particulate material is not thought to be of significant importance to the method, providing that the material can be poured and can flow down the dispensing tubes 40 of the hopper 38b.

The collection hopper 44 is arranged for rolling movement along the ground beneath the oven 1, between the wheels 8 at each end of the oven 1. The collection hopper my thus be moved in a direction generally parallel to the rails 31.

As illustrated most clearly in FIGS. 20 and 21, a pressing arrangement 65 and a pusher arrangement 66 is provided on each side of the oven 1, each pressing arrangement working in concert with the associated pusher arrangement from respective sides of the oven 1, as will become clear. Also, a pair of carriage arrangements 49 are provided; each on a respective side of the oven 1. However, it is to be appreciated that the method could alternatively use just a single pressing arrangement 65 and associated pusher 66 and carriage 49.

A control panel 78 is operatively connected to all of the various motors, heaters, coolers and actuators, the panel thus controlling the entire moulding process.

A typical moulding cycle appropriate to mould a high-strength panel will now be described.

Firstly, a mould 2 is closed by clamping the two mould parts 24, 25 together to define the mould cavity 26 therebetween. This is performed on one of the carriage arrangements 49, most conveniently with its cantilever support frame 59 arranged horizontally. Once the mould 2 is securely clamped, the cantilever frame 59 is then rotated through 90 degrees via the carriage motor 57 so that the mould 2 is moved to a substantially vertical orientation. The oven 1 is then opened by moving the two oven parts 3, 4 apart from one another as illustrated in FIG. 1. With the gantry 61 and the array of fans 64 swung clear of the mould 2, the carriage 59 is then advanced towards the oven, moving between the press 65 and the pusher 66, to move the mould 2 into the oven. As will be seen from FIG. 20, the upstanding post 60 supporting the gantry 61 is sufficiently high for the gantry 61 to move over the top of the pressing arrangement 65 without obstruction.

Once the mould 2 has been placed inside the oven 1 in the position illustrated in FIG. 2, the two parts 3, 4 of the oven are moved towards one another to close the oven around the mould 2. As will be noted in FIGS. 1 and 2, each part 2, 3 of the oven has a semi-circular cut-out 79, the two cut-outs cooperating to fit around the shaft 54 of the carriage arrangement 49. In this manner, the oven 1 can be closed around the mould 2 whilst the mould remains supported in the vertical orientation by the cantilever frame 59 of the carriage.

The bottom closure 28 of the mould 2 is then closed by the lower closure rod 17 on the oven. The lower and upper door flaps 11, 12 of the oven are then moved to their horizontal positions in which they close to the bottom and top of the mould 2. The heaters 10 inside the oven are then energised to pre-heat the mould 2. The mould is preferably pre-heated in this manner to a temperature in the range of 200° C. to 240° C., and most preferably 220° C.

The filling hopper arrangement 29 is then operated to move the first filling hopper 38a to a position vertically above the oven 1. When the mould 2 reaches its designated pre-heated temperature, the first filling hopper 38a is then lowered along its vertical members 36 such that the dispensing tubes move into the mould cavity and are lowered towards the bottom of the mould. The hopper valve 42 is then actuated to fill the mould with the first particulate material. The vibrators 42 are energised to ensure steady and uninterrupted flow of material down the dispensing tubes. The hopper 38a is steadily raised along its vertical members 36 as the mould 2 fills with the first particulate material. Once the mould 2 is completely filled with the first particulate material, the hopper valve 42 is closed and the hopper 38a is raised and moved clear of the oven to its park position as illustrated in FIG. 21.

The top closure 27 on the mould is then closed by the upper closure rod 17 on the oven and the heaters 10 continue to operate to heat the mould 2. During this heating phase, the first particulate material is melted in the regions against the inner surfaces of the two mould parts 24, 25. An outer skin of the material is thus formed against the opposed surfaces inside the mould 2. The oven door flaps 11, 12 remain in their substantially horizontal positions during this heating phase, and are thus effectively closed against the top and bottom of the mould 2. This prevents significant heating of the top and bottom closures 27, 28 of the mould, thereby preventing the formation of a skin against the inside surfaces of the closures.

The mould is typically held at an elevated temperature of approximately 220° C. for a period of 8 minutes during this heating phase, which is effective to form an outer skin of approximately 3 to 4 mm thick against the inner surfaces of the mould. However, longer heating periods may be used if it is desired to form thicker skins.

During the first heating phase described above, the collection hopper 44 is moved into a collection position in which it is located immediately below the mould 2.

Upon completion of the skin-forming heating phase, the bottom mould closure 28 is opened and the unmelted particulate material remaining between the two layers of outer skin formed inside the mould is permitted to fall down from the mould 2 and into the collection hopper 44. The collection hopper 44 is then moved out from underneath the oven and the particulate material inside can then be returned to the first filling hopper 38a, for example via a worm-screw arrangement or the like (not shown).

Once all the unmelted particulate material has been removed from the mould 2 as described above, the bottom closure 28 of the mould 2 is closed and the top closure 27 is opened. The second filling hopper 38b is then (or simultaneously) moved into to a filling position above the mould 2 and is operated as before to fill the mould 2 with the second particulate material, between the two layers of skin formed against the opposed surfaces inside the mould 2. The top mould closure 27 is then closed once again.

The door flaps 11, 12 of the oven are then all moved from their horizontal positions to their tilted positions via operation of their respective actuators on the oven. As will be appreciated from consideration of the tilted lower door flaps 11 shown in FIG. 2, this is effective to permit the hot gases inside the oven to move around the ends of the mould 2 and in particular to heat the mould closures 27, 28. The top and bottom shut-off members 19, 20 are closed to prevent the escape of hot gases from the oven.

The heaters 10 then heat the mould 2 and the second particulate material therein for a second heating phase, in order to cure the second particulate material and thereby form an inner core of plastic material inside the outer skin. It is proposed that this heating phase will continue for approximately 20 minutes at a temperature of 220° C. This has been found sufficient to cure the second plastic material when producing a moulding having a thickness of 65 mm. During this heating phase it may be necessary to rotate the mould 2 inside the oven via rotation of the supporting cantilever frame 59 on the carriage 49, in order to ensure even heating throughout the mould so that the entire volume of the second particulate material is cured.

The method steps described above are effective to produce a moulding having a predetermined thickness defined by the size of the mould 2. However, further steps are necessary to process the moulding into a finished panel. These will now be described.

Following completion of the second heating phase described above, the oven 1 is opened and the mould 2 retrieved via movement of the carriage arrangement 49 away from the oven.

The next processing steps are performed outside the oven which means that the oven is now free for use in producing another moulding via the operation of the equipment located on the opposite side of the oven 1, in a similar manner to that described above.

The mould 2 removed from the oven will be hot and so it is necessary to cool the mould before it can be opened and the moulding inside safely removed for further processing. The gantry 61 and array of fans 64 is thus moved into position above the mould, and the fans are energised to direct a cooling flow of air (and optionally a mist) downwardly and over the mould. The mould 2 may be rotated during this cooling phase.

The mould 2 is then opened. This is done with the mould supported in a horizontal position between the pusher arrangement 66 and the pressing arrangement 65 by the underlying cantilever frame 59 as illustrated most clearly in FIG. 21. The gantry 61 may be used as a crane to lift the upper part of the mould 25 away from the lower part 24.

The pusher arrangement 66 is then actuated to slide the moulding 77 into the space between the two platens 70, 71 of the pressing arrangement 65. The pushing rods 75 slide the moulding 77 onto the lower platen 70 and are then retracted back into their park position.

The pressing arrangement 65 is then actuated to simultaneously cool and compress the moulding 77 between the platens 70, 71. The pressing cylinder 72 is actuated to press the upper platen 71 against the moulding with a pressing force. The pressure applied by the press is preferably in excess of 150 N/cm$^2$. An applied pressure of approximately 190 N/cm$^2$ has been found particularly effective, and in a typical case this will require pressing force of approximately 60 tons. At the same time, the cooling arrangement is operated to pump coolant through the channels inside the platens 70, 71 to chill the moulding 77 as it is being pressed.

The press 65 is operated to compress the moulding 2 so as to reduce its thickness down to a desired thickness of the finished panel, whilst simultaneously imparting a surface finish to the panel corresponding to any relief pattern formed on the platens.

By way of example, a substantially rectangular (400 mm×700 mm) moulding 77 formed inside the mould 2 having an initial thickness of 65 mm, can be compressed down to a thickness in the region of 30-50 mm in the press under a pressure of 190 N/cm$^2$, whilst being cooled. The thickness of the moulding is thus typically reduced by 20% or more in the press. It has been found appropriate in the production of such panels to operate the press in this manner whilst cooling the moulding from a starting temperature of approximately 200° C. (following removal from the mould 2) down to approximately 30-40° C. over a period of approximately 8 minutes.

Panels manufactured by the above-described process (for example panels having a total thickness of approximately 48 mm and a skin thickness of approximately 3-4 mm) have been found to have extremely good structural properties and integrity. It has been found that by producing an interim moulding 77 of greater thickness and then compressing it to the desired panel thickness whilst simultaneously cooling the moulding/panel results in a significantly improved product when compared to products obtained by the prior art methods. Panels manufactured in accordance with the method of the present invention typically have much improved flatness and integrity.

Whilst the present invention has been described above with specific reference to the use of a pressing arrangement comprising a pair of pressing platens, it is to be appreciated that other types of pressing arrangement could be used without departing from the scope of the claimed invention. For example, it is envisaged that variants of the equipment described above could be used for the method of the invention, and which may incorporate one or more pairs of pressing rollers arranged to apply the required pressing force to the moulding as it is moved through the nip between the or each pair of rollers. Metal rollers are particularly suitable for such an arrangement as they can relatively easily be chilled, for example by the provision of internal fluid channels for the flow of water or other liquid coolant. It is envisaged that one or both of each pair of said rollers would be configured to be urged, for example either pneumatically or hydraulically, towards the oppositely arranged roller to apply the requisite pressing force to the moulding. The external surfaces of one or both of each pair of rollers may have a relief pattern formed therein so as to impress a corresponding pattern into the outer surfaces of a panel to be formed therebetween.

As will be appreciated, in this alternative type of roller press the moulding will still be simultaneously cooled and compressed so as to reduce its thickness as proposed above. It is envisaged that in order to achieve a sufficient reduction in the thickness of the moulding via use of a roller press, the reduction will need to be achieved over a longer footprint of the equipment which may require more space than in the case of the platen press arrangement discussed above.

More generally, it is proposed that the pressing equipment suitable for use in the method of this invention could be configured in other ways, the important aspect being that it must be effective to compress the moulding, whilst the moulding is simultaneously cooled, so as to achieve the desired thickness and flatness in the finished product.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A method for producing a moulded plastic product having an outer skin and in inner core, the method comprising the steps of: providing a mould having a mould cavity; forming an outer skin from a first plastic material on at least two opposed surfaces inside the mould cavity; forming an inner core from a second plastic material inside the mould cavity; and at least partially curing the plastic materials to form a moulding inside the mould cavity via the application of heat, the method being characterised by the subsequent steps of simultaneously cooling the moulding and compressing the moulding so as to reduce its size in at least one dimension to a desired dimension of the finished product.

2. A method according to claim 1, wherein the moulding is removed from said mould cavity prior to the simultaneous steps of cooling and compressing.

3. A method according to claim 2, wherein said simultaneous steps of cooling and compressing are performed in a press having a cooling arrangement configured to cool the moulding whilst in the press.

4. A method according to claim 1, wherein the cooling step is effective to reduce the temperature of the moulding from over 200° C. to under 40° C.

5. A method according to claim 1, wherein the compressing step is effective to reduce said dimension by at least 20%.

6. A method according to claim 1, wherein the compressing step comprises applying a pressure of at least 150 N/cm$^2$ to the moulding for the duration of the cooling step.

7. A method according to claim 1, wherein said step of forming the outer skin comprises filling the mould cavity with said first plastic material in particulate form, heating the mould to form a skin of melted particulate against said at least two opposed mould surfaces, and removing un-melted particulate from the mould cavity once a desired thickness of skin has been formed on said surfaces.

8. A method according to claim 7, wherein said step of removing un-melted particulate from the mould cavity is performed by opening an outlet aperture formed in a lower part of the mould, and permitting the un-melted particulate material to fall through the outlet aperture under gravity or by turning the mould to pour out the un-melted material.

9. A method according to claim 8, wherein said outlet aperture is subsequently closed after removal of the un-melted particulate material, ready for the receipt of said second plastic material in the mould cavity.

10. A method according to claim 7, wherein said step of filling the mould cavity with said first plastic material involves pouring said material in particulate form through an inlet aperture formed in an upper part of the mould, and subsequently closing said inlet aperture.

11. A method according to claim 1, wherein said step of forming the inner core comprises filling the mould cavity with said second plastic material in particulate form after the formation of the outer skin on said at least two opposed surfaces, and heating the mould to at least partially cure substantially the entire volume of said second material inside the mould cavity.

12. A method according to claim 11, wherein said step of filling the mould cavity with said second plastic material involves pouring said material in particulate form through an inlet aperture formed in an upper part of the mould, and subsequently closing said inlet aperture.

13. A method according to claim 11, wherein the mould is held at an internal temperature of at least 200° C. for a period of at least 5 minutes.

14. A method according to claim 1, wherein at least one of said first and second materials comprises recycled High Impact Polystyrene (HIPS).

15. A method according to claim 1, wherein the second material comprises recycled polyethylene.

* * * * *